United States Patent [19]

Appel et al.

[11] 3,792,243

[45] Feb. 12, 1974

[54] METHOD FOR ENCODING POSITIONS OF MECHANISMS

[75] Inventors: Arthur Appel, Yorktown Heights; Arthur J. Stein, Peekskill, both of N.Y.

[73] Assignee: International Business Machines Corporation, Armonk, N.Y.

[22] Filed: Dec. 30, 1971

[21] Appl. No.: 214,142

[52] U.S. Cl. ............ 235/151, 340/324 A, 340/337, 340/339, 340/365, 352/39

[51] Int. Cl. ...................... G03b 15/06, G03b 29/00

[58] Field of Search .. 444/1; 235/151; 340/146.3 H; 352/39

[56] References Cited

UNITED STATES PATENTS

| | | | |
|---|---|---|---|
| 2,041,589 | 5/1936 | Bowers | 340/339 |
| 3,308,438 | 3/1967 | Spergel et al. | 340/172.5 |
| 3,510,210 | 5/1970 | Haney | 352/39 |

OTHER PUBLICATIONS

"Computer Programs Designed to Solve Humanistic Problems" in Computers and the Humanities, Vol. 1, Issue 2, Nov. 66, p. 53, L 7140–0270.

*Primary Examiner*—Eugene G. Botz
*Attorney, Agent, or Firm*—Isadore Match

[57] ABSTRACT

There is disclosed herein a method of digitizing two or three dimensional mechanisms in varied positions. If the object to be encoded is a fixed model, then such model in its fixed position is encoded. If the object is a movable mechanism, then the mechanism can be encoded in several positions whereby there can be provided a set of the mechanism's motions. The method includes the steps of providing a plurality of coordinates pickup points on the object or mechanism to be encoded. These points are sensed in Cartesian coordinates orientation, using a capacitance tablet, for example, to provide the Cartesian coordinates information for each of the sensed points. The Cartesian coordinates information is suitably provided to a digital computer interactive graphics device combination wherein, utilizing the Cartesian coordinate points information of the sensed points, a displayable projection of the object or mechanism can be calculated and such projection can be displayed on the screen of the interactive graphics device. Where it is desired to encode a three-dimensional mechanism, the encoding information can be obtained in perpendicular capacitance tablet planes or in poses displaced by 90° to enable the providing of X, Y and Z coordinates information. In addition, if the mechanism is of a movable type, then it can be encoded in different positions and, in the computer, the encodings for these different positions can be extrapolated to enable the calculations of a series of displayable projections which form an animated sequence. The projections can be calculated, using the Cartesian coordinates information, to provide either two- or three-dimensional projections.

10 Claims, 12 Drawing Figures

METHOD FOR ENCODING POSITIONS OF MECHANISMS

BACKGROUND OF THE INVENTION

This invention relates to devices and methods for encoding two or three dimensional mechanisms. More particularly, it relates to a relatively simple digitizing arrangement which can digitize two or three dimensional objects and mechanisms in various positions, the results of such digitizing being useful for technical analysis or artistic purposes.

In U.S. Pat. No. 3,510,210 of V. Haney assigned to the Xerox Corporation, Rochester, New York, there is disclosed a technique wherein an actor can wear reflective or luminous elements which can be detected by a vidicon television camera. The positions of these elements are computer stored as the actor goes through various motions and these motions, encoded by the computer, can be compared with a file of cartoon character poses. The poses which are selected can then be assembled into an animation sequence.

In the publication entitled "The Lincoln Wand" Proceedings of the Fall Joint Computer Conference, 1966, on pages 223 to 227, there is disclosed a device which employs sound waves to encode positional information in two or three dimensions. Similarly, in the publication entitled "A Sonic Pen: A digital Stylus System" of A.E. Brenner and P. de Bruyne on pages 346 to 348 of the IEEE Transactions On Computers, June 1970, there is disclosed a sonic pen which also uses sound waves to encode positional information in two or three dimensions. In addition, there are known in the art, tablets which employ capacitance measurements to encode a pen position.

It has been observed that, while using a tablet of the above-mentioned type with an interactive graphics display device such as the one designated 2250/1130 manufactured by the IBM Corporation, a pen's X,Y position is detected accurately even when the point of the pen does not make contact with the surface of the tablet. In fact, the pen may be lifted off the surface as much as eight inches and yet the display on the interactive graphics device screen of an encoded point is as steady as if the pen's point were in contact with the tablet surface. It can thus be appreciated that a tablet can provide not only the position of a point on its surface but also the projection of a point onto that surface. It has also been observed in connection with the use of the tablet that the presence of non-metallic objects is of no effect and that small metal objects have a minimal effect. Furthermore, it has been observed that additional shielded RF wire laying on the tablet surface does not effect the tablet's pen if the shielding of these wires is grounded to the pen shield. In addition, if the length of shielded wire is contacted to the pen's point and the shield is contacted to the pen's shield, then, the exposed wire tip can be employed to encode positional data.

In the use of these tablets, if two are employed, they can be mounted at right angles to each other, to thereby enable the encoding of three-dimensional objects. A non-metallic model of an object can thus be traced and the coordinates of points on the model and the topological conductivity of these points can be automatically stored by data processing utilizing a suitable program.

An important object of this invention is to provide an arrangement and a method for enabling the encoding of objects and mechanisms in various positions.

It is another object to provide an arrangement and a method for enabling the encoding of three-dimensional mechanisms whereby their motions can be analyzed by mathematical techniques.

SUMMARY OF THE INVENTION

Generally speaking and in accordance with the invention, there is provided a method for encoding an object. The method comprises the steps of providing a plurality of coordinates pickup points on the object and sensing these points in Cartesian coordinates orientation to provide the Cartesian coordinates information for each of the points. This information is provided suitably to a digital computer interactive graphics combination wherein the information is stored in the computer. The stored information is then utilized in the computer to calculate a displayable projection of the object which can be displayed on the screen of the interactive graphics device. The object which is utilized may be of the fixed or movable type and can be the original object or a model thereof. For example, instead of the original movable object, there can be utilized a replica thereof such as a mannequin which has movable sections to simulate the various positions and poses that the movable object takes in its normal operation. Thus, within the contemplation of the invention, there can be encoded the coodinates pickup points in different positions of the object. In addition, the objects can be encoded in poses at 90° to each other or in mutually perpendicular planes to provide X,Y and Z coordinates information to enable the calculation in the computer of three-dimensional projections. The sensing of the pickup points can be effected either manually or automatically and the Cartesian coordinates orientation can be provided by projecting the sensing of these points onto a mechanism such as a capacitance tablet to provide Cartesian coordinates information which is transmitted to the computer/interactive graphics device for use in the projection calculations.

The foregoing and other objects, features and advantages of the invention will be apparent from the following more particular description of a preferred embodiment of the invention as illustrated in the accompanying drawings.

DESCRIPTION OF A PREFERRED EMBODIMENT

The encoding of the motions of a moving object such as, for example, the human figure moving in three dimensions has proven to be a complex task. The specifying of these motions relative to angular changes and translation in space of these motions are quite difficult since suitable equations for such motions are not available.

Figure 1:
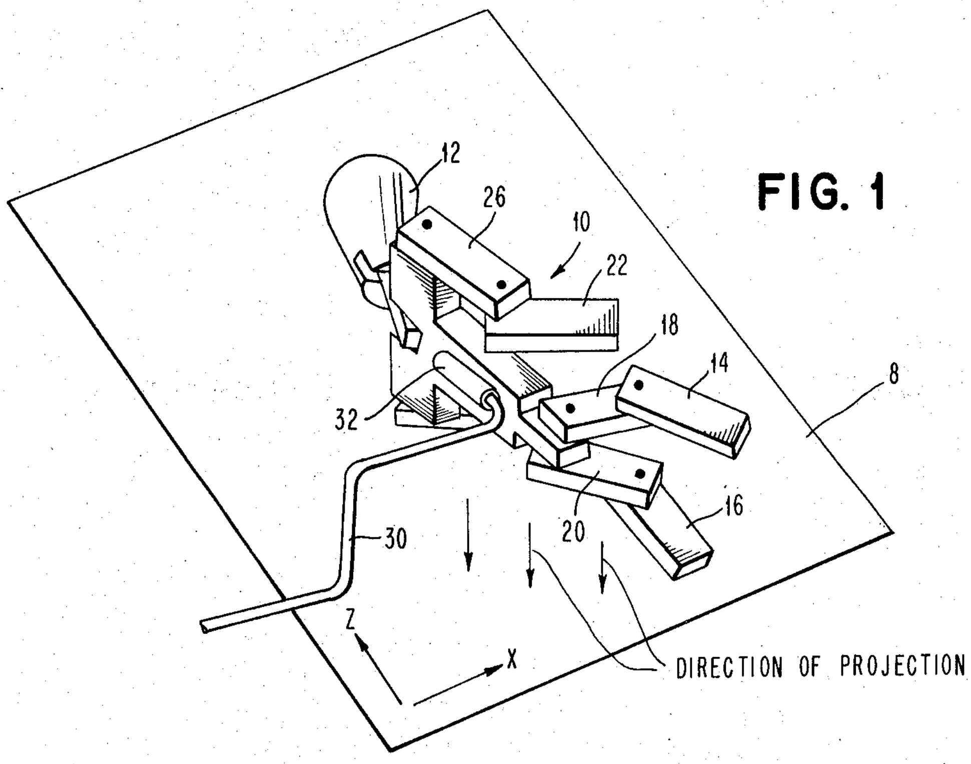
FIG. 1 is a three-dimensional depiction of a mannequin which has movable limbs and which is suitable for use in carrying out the invention, the mannequin being shown projected over the surface of a capacitance tablet of the type which cooperates with an interactive graphics device.
Figure 2:
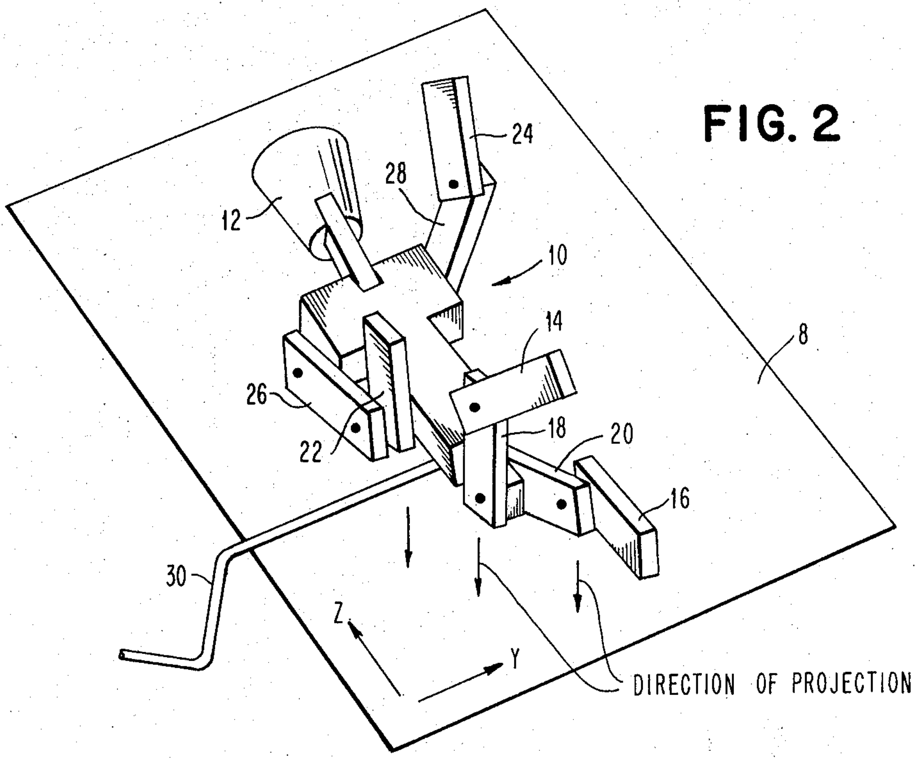
FIG. 2 is a drawing similar to FIG. 1 and wherein the mannequin is posed in a plane perpendicular to the one in which it is posed in FIG. 1.
Figure 3:
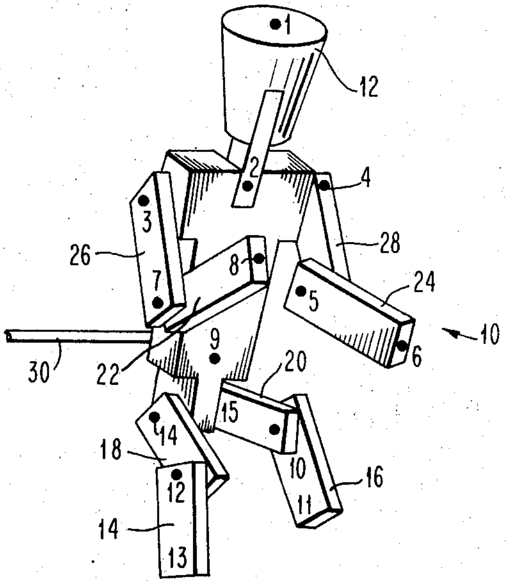
FIG. 3 shows the mannequin of FIGS. 1 and 2 with the coordinates pickup points placed at different locations thereon.

Thus, in accordance with the invention, there is included the use of a manipulable object such as a simple mannequin that can be manipulated for computer animation. As shown in FIGS. 1 and 2, a mannequin is depicted as suspended over the surface 8 of a tablet which is used in conjunction with an interactive graphics device such as the IBM 1130/2250 mentioned hereinabove. The mannequin 10 comprises a head section 12, pivotedly movable sections 14 and 16 which correspond to legs, pivotedly movable sections 18 and 20 which correspond to thighs pivotedly movable sections 22 and 24 which correspond to forearms and pivotedly movable sections 26 and 28 which correspond to upper arms. Mannequin 10 is supported by a member 30 which is hinged on the mannequin by a 90° hinge 32. Suitably, the mannequin is made of a non-metallic material. The joints between the various sections which represent limbs and which enable the sections to be pivoted are also of a non-metallic type. The position of the mannequin in FIG. 1 is on the plane formed by X and Z axes. FIG. 2 shows the mannequin of FIG. 1 rotated 90° and disposition of the mannequin therein is on a plane formed by the Z and Y axes. FIG. 3 shows the coordinate pickup points of the mannequin depicted in FIGS. 1 and 2, the latter points ranging from 1 to 15.

The mannequin shown in FIGS. 1, 2 and 3 can be manipulated for computer animation. The animator can adjust this mannequin and then hold the tablet pen against one of the coordinate points as shown in FIG. 3 as he interrupts the computer to record the point. In one pass, the animator can encode all of the points as they are projected on the XZ plane. He can then rotate the mannequin 90° and encode all of the points as projected on the YZ plane. The program resident in the interactive graphics device can then process the encoded points, calculate and store the angles of the sections representing limbs, store the actual positions of the mannequin and present a perspective picture thereof. The animator can develop a file of the mannequin in many poses and further computer processing can interpolate between poses to produce an animated sequence in three dimensions. Although programs are already in existence which can produce three-dimensional movies, the advantage presented by the use of a mannequin is the artist immediately gets a desired pose and receives immediate feedback from the interactive graphics device.

Figure 4:
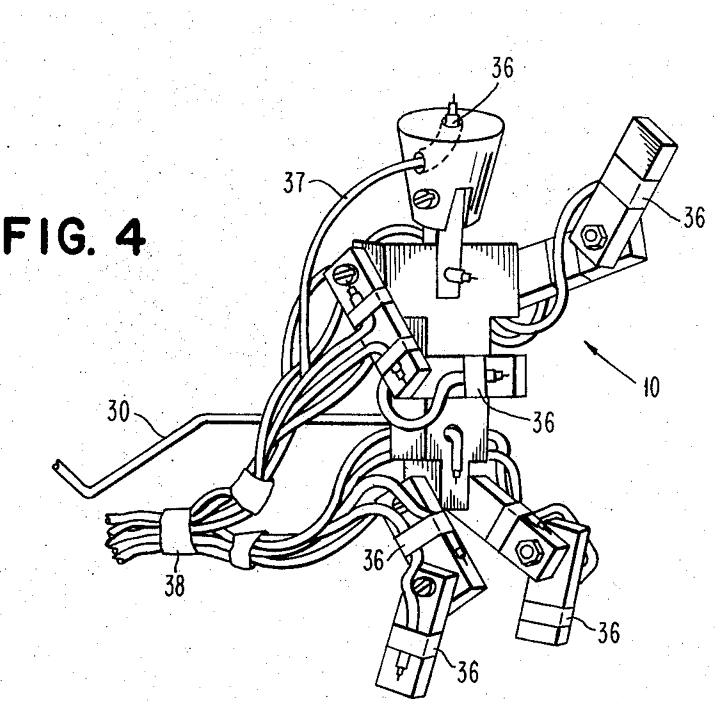
FIG. 4 is a view similar to that of FIG. 3 showing the exposed tips of wires connected to the coordinates pickup points, such wires being utilized to automatically sense the pickup points in cooperation with the selector switch.
Figures 5, 6:
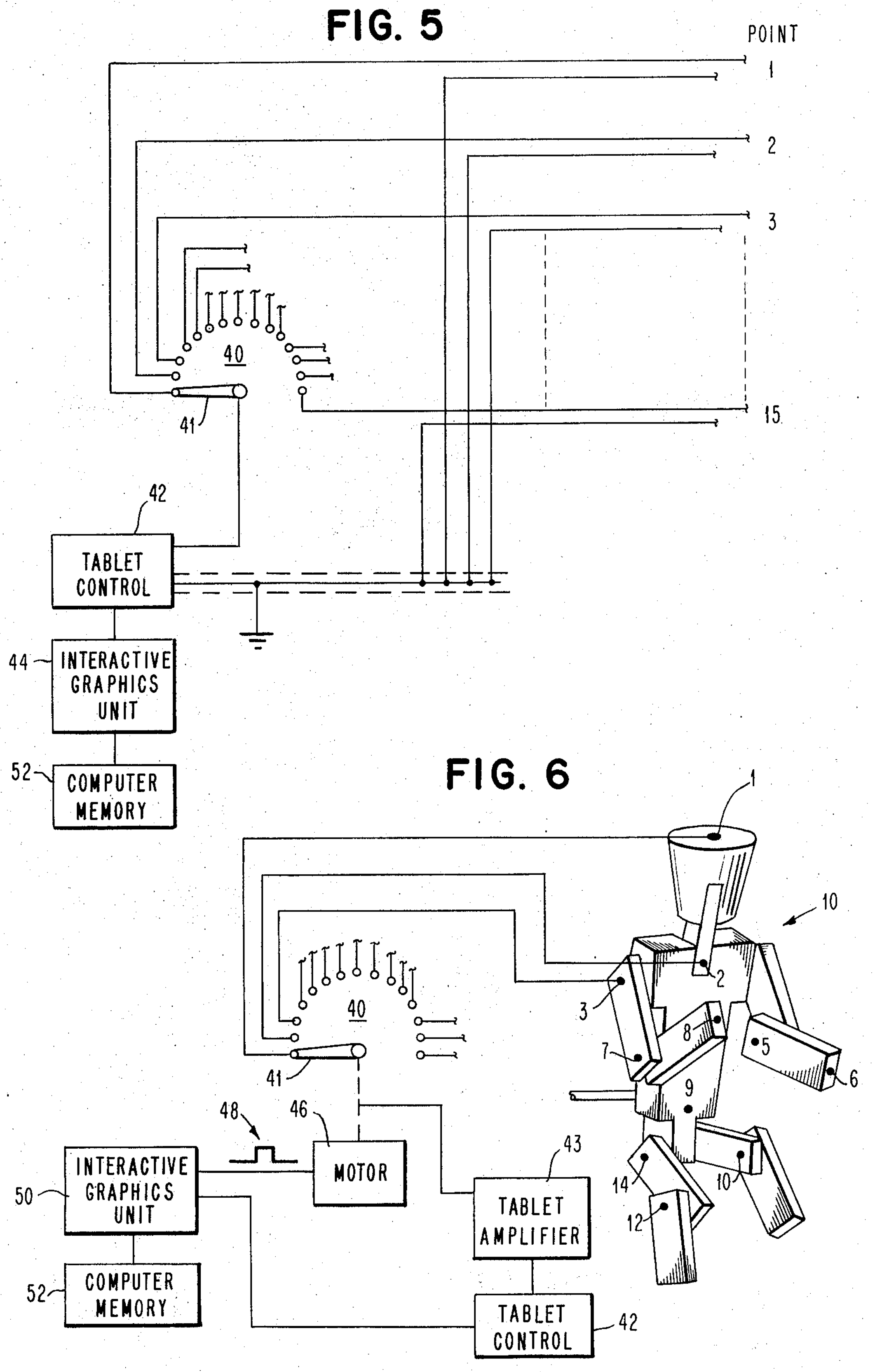
FIG. 5 is a diagram showing a selector switch for actuating wires to enable the sensing of the pickup points on the mannequin.
FIG. 6 is a diagram similar to that of FIG. 5 and shows a motor-driven selector switch.

Since the manual touching of the coordinate pickup points, as shown in FIG. 3, may not be entirely reliable, multiple wires may be affixed to the mannequin as shown in FIG. 4. In the arrangement in FIG. 4, wire tips are affixed to the sections representing limbs and almost total reliability is obtained in detecting the points. In FIG. 4, wire 37 is a typical example of a shielded wire and wire end 36 is the exposed point of wire 34. The wires are suitably taped to various components of the mannequin by tape such as 36. The wires from the various points on mannequin 10 converge at location 38 and may therefrom suitably be connected to a selector switch. In FIG. 5 there is a diagram of how the various wire point as shown in FIG. 4 extends to a selector switch 40.

As shown in FIG. 6, selector switch 40 may suitably be of the manual or motor driven type. Its movable arm 41 is connected to a stage legended tablet control which is a stage conventionally associated with a tablet wherein the various signals picked up from the mannequin by the exposed tips are processed and transmitted to the interactive graphics unit 44. In the use of the selector switch 40, the animator need only pose the mannequin and then dial in the selected points to be encoded.

As shown in FIG. 6, to effect synchronization between a motor driven seletor switch and a processing computer which controls the interactive graphics device, the motor 46 for driving switch 40 can be driven from the computer by pulses schematically depicted at 48 which pulse the motor. The motor controlling the rotor 41 of switch 40. The signals from rotor 41 are applied to the tablet amplifier 43. The output of tablet amplifier 43 is applied to the tablet control 42 and the output of tablet control is applied to interactive graphics unit 44 which intercommunicates with its control computer 52. The information from tablet control 42 is to interrupt to provide X,Y, and Z data.

An advantage presented in the use of a mannequin to encode a three-dimensional figure is the absence of the need of the mannequin to be an exact copy of the figure to be computer animated. Thus, the mannequin provides the positions of the figure but the stored description of the figure can be more detailed. These details can be manipulated by programs. In addition, one mannequin can be used for the development of several different animated characters. The mannequin, of course, need not represent a single character. Thus, for example, there can be provided a model of a rider on a horseback, toe dancers, several aircraft flying over a carrier, etc.

The concept, in accordance with the invention, for sampling coordinate points on a mannequin is readily extended to the recording of points on a movable mechanism of any type. Thus, it is quite facile to make an inexpensive model of the mechanism. By attaching data encoding wires to any desired points on such model, the momentary positions of these points can be quickly recorded as the model is manipulated. In addition, if a model of a mechanism is built and if such mechanism is driven by a stepping motor with points encoded and catalogued with a stepping index as a parameter, then a time-based analysis of the points which are recorded is enabled. The vector changes in point positions in such situations can be taken to be the velocity at that juncture. Such technique is particularly valuable for analyzing mechanisms which are difficult to represent mathematically and is analagous in some respects to the calculations performed by an analog computer.

Generally, for three-dimensional mechanisms, mathematical analysis is quite difficult and the programming of analytical problems is extremely costly. Thus, in accordance with the invention, the enabling of the recording of coordinate points in time on a model of a three-dimensional mechanism as described hereinabove is quite valuable and necessary in several applications. For example, three-dimensional mechanisms that the model technique in accordance with the invention can be applied to include such diverse examples as helicopter blade tilting, fittings, aircraft flap actuators, variable sweep aircraft wings, landing gear, type-setting machines, weaving machines, analog mechanical controllers such as turbine valve governors, toroidal wire wrapping machines, earth moving equipment, etc. In addition, sensing devices which record the motion of mechanisms are usually expensive and difficult to install without interfering with the mechanism's motions.

Figure 7:
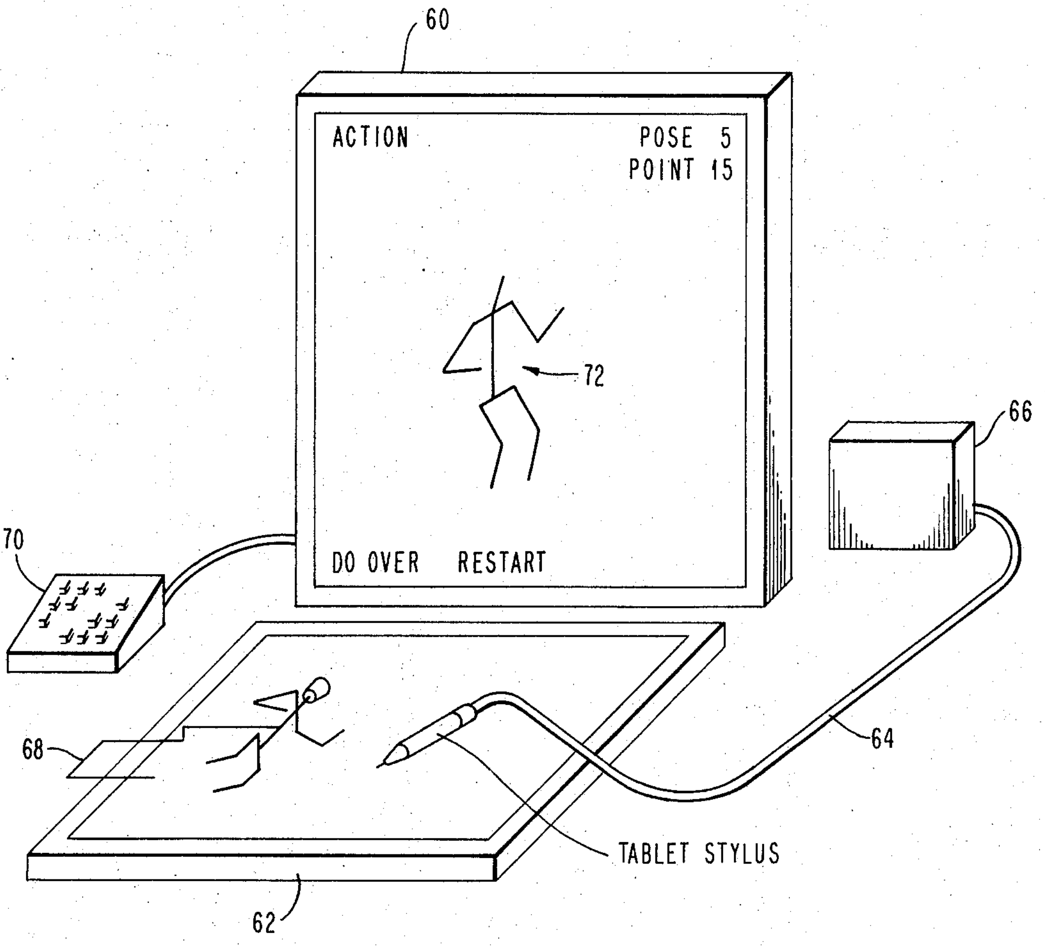
FIG. 7 is the depiction of the apparatus comprising the capacitance tablet and the interactive graphics device and its utilization in accordance with the invention.

In FIG. 7 there is shown generally the apparatus utilized to implement the inventive concept. The apparatus comprises a display unit 60 which may suitably be the aforementioned IBM 2250 interactive graphics display unit manufactured by the IBM Corporation, the latter display unit being suitably controlled by an IBM 1130 computer also manufactured by the IBM Corporation. The structure and operation of the latter IBM devices are described in the IBM Systems Reference Library publication entitled "IBM 1130 Computing System Component Description," "IBM 2250 Display Unit Model 4, Form No. 1130-03, Form A27-2723-1." The tablet 62, the tablet stylus 64, and the tablet controller 66 may suitably be of the type known as the Sylvania DT-1 manufactured by the Sylvania Division of the General Telephone and Electronics Corporation. A description of the structure and operation of the DT-1 Sylvania Tablet and its associated controller and stylus F is set forth in the publication entitled, "The Sylvania Data Tablet: A New Approach to Graphic Data Input," AFIPS Conference Proceedings, Spring Joint Computer Conference 32, 315-321 (1968). The mannequin and its support member 68 is of the type described hereinabove in FIGS. 1–6. The alphanumeric keyboard 70 is a well known input device to a data processing system and may be of the type as described in the aforementioned IBM publications. The legend "pose 5" on the screen of display device 60 is the pictorial representation of a pose count which will be further described hereinbelow. The legend "point 15" is a pictorial representation of the point count on the screen of the display device and is also explained further hereinbelow. The legends "action," "do over," and "restart" pictorially represented on the screen of display device 60 are examples of light keys as is also further explained hereinbelow. The mannequin is shown schematically displayed on the screen of display device 60 at location 72, it being shown drawn in schematic form in isometric representation. The tablet stylus is utilized to touch the pickup points on the mechanism being encoded and the sensing of these points is projected onto the surface of the tablet. Where a selector switch and wires are employed as shown in FIGS. 5 and 6, then the stylus is not employed and the wires are actuated as desired.

Figure 8:
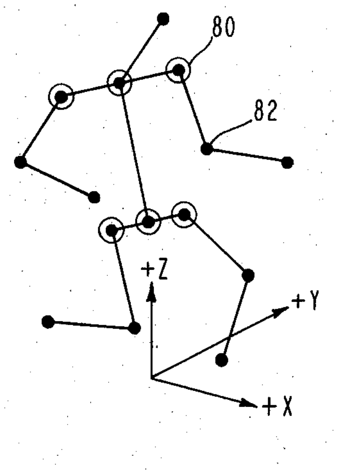
FIG. 8 is the schematic representation of the mannequin shown in three dimensions in FIGS. 1 and 2 and indicates the Cartesian coordinate axes orientations.

FIG. 8 shows a linear representation of the mannequin to illustrate the fixed and movable vertices. Thus, the vertex such as shown at 80 is a typical fixed vertex and is fixed in space by mechanical restraint and the vertex shown at 82 is a typical movable vertex. The depiction of the coordinates +X, +Y, and +Z show the relationship of the mannequin to the Cartesian coordinate planes.

Figure 9:
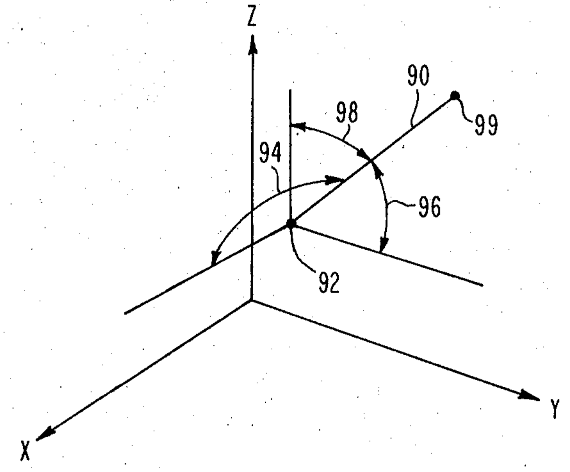
FIG. 9 is a diagram which illustrates how information is provided for calculating the direction cosines in accordance with the invention.

FIG. 9 shows how the direction cosines A, B, and C are derived upon the coding of the pertinent points on the mannequin or model in the computer. The lines X, Y, and Z are the Cartesian coordinate axes. The line 90 in FIG. 9 represents the typical limb on the mannequin. Point 92 is a vertex. Arrow 94 is the arc of angle $U$. Arrow 96 is the arc of angle $V$, and arrow 98 is the arc of angle $W$. Point 99 is also a vertex. Angles $U$, $V$, and $W$ are angles with coordinate axes. The direction cosines are: $A =$ cosine $U$, $B, =$ cosine $V$, and $C =$ cosine $W$.

Figures 10, 10A:
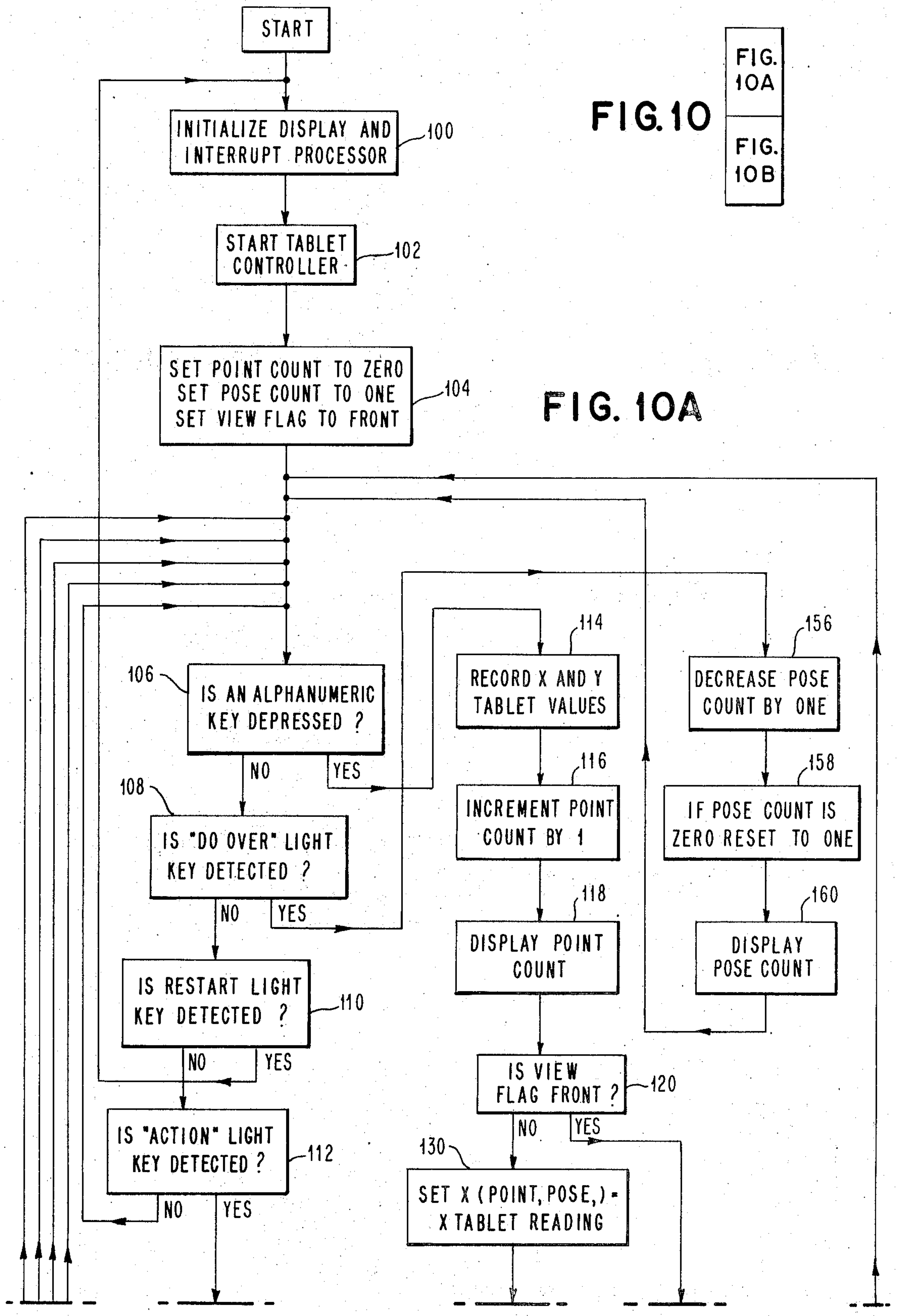
FIGS. 10A – 10B taken together as in FIG. 10 is a flowchart of a program suitable for use to provide the displayable projections according to the invention.
Figure 10B:
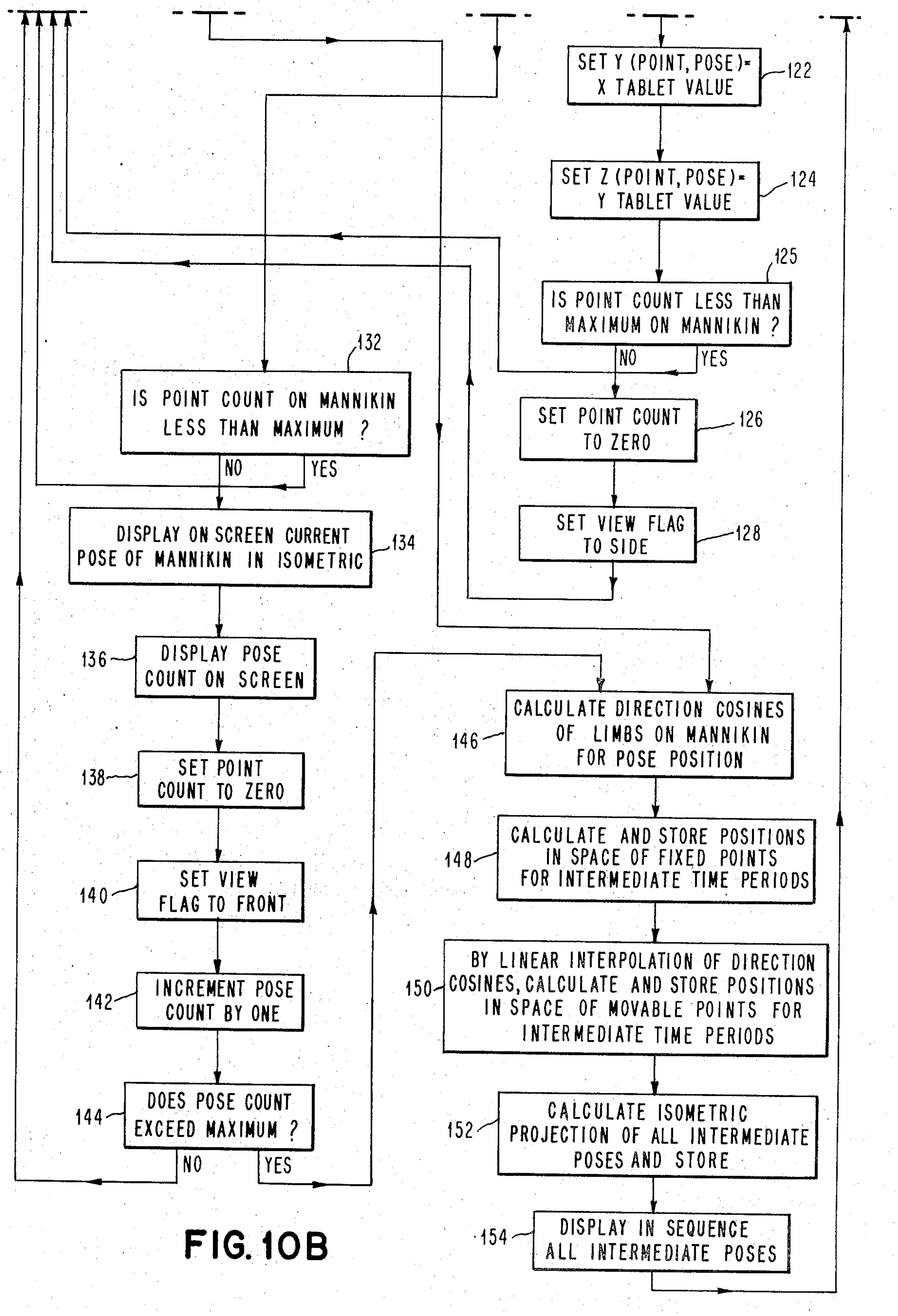

In FIGS. 10A – 10B, the taken together as in FIG. 10, there is shown a flowchart of a program whereby a two-or-three-dimensional mechanism can be encoded in accordance with the invention. The description of this program entails the use of the IBM 1130/2250 Interactive Graphics Display Systems. The graphic subroutine package used in the latter system is described in the IBM publication entitled "IBM 1130/2250 Graphic Subroutine Package for Basic FORTRAN IV, Program No. 1130-OM-008," File No. 1130-25, Form C27-6934-1. A description as to how an IBM 2250 display unit attached to an IBM 1130 computing system can define and initiate jobs to be processed by the IBM System/360 operating system is disclosed in the IBM publication entitled "IBM System/360 Operating System and 1130 Disk Monitor System, User's Guide For Job Control from an IBM 2250 Display Unit Attached to an IBM 1130 System, Program Nos. 360S-RC-543 1130-CQ-012," File No. S360/1130-36, Form C27-6938-1.

Reference is now made to FIGS. 10A – 10B taken together as FIG. 10 wherein there is depicted a flowchart of a program which can be suitably employed with the mannequin and the mechanism shown in FIGS. 1–6 to effect encoding of the motion of a three-dimensional mechanism. This program is suitably carried out in a device such as the abovementioned 1130 computer, 2250 interactive graphics unit manufactured by the IBM Corporation and a tablet type encoder such as the Sylvania tablet mentioned hereinabove.

In the program, in step 100, the initialized display and interrupt processor step is a conditioning step which provides an initial point for the execution of the program. The step signifies that the display unit has been set up to display pictures to receive interrupts, and to also display light keys which are employed to interrupt the processor. The interrupting of the processor is a conventional mechanism and is disclosed in the manuals appertaining to the 1130 as set forth hereinabove. In step 102, the tablet controller is started. This step signifies that the tablet has now been conditioned to receive X, Y coordinates information. In block 104, which is an assignment block, in the first step therein the point count is set to zero. This point count is stored as a program variable in the 1130 computer and will be employed therein as will become apparent below to keep track of stored coordinates. The second step in block 104 is the setting of the pose count to one. Here again, this setting is also for the same reason as the setting of the point count since the count keeps track of the pose coordinates. In the third step in block 104, the view flag is set to "front" the significance of which will become apparent hereinbelow. In this connection, the flag can assume two positions, front and side and these positions can be stored in the computer by the opposite binary states of a bit.

As will be become apparent hereinbelow, the point count is incremented every time another point on the three-dimensional mechanism is stored. Also, the pose count is incremented every time that the pose is changed on the three-dimensional mechanism. Coordinates are stored as a two-dimensional array wherein one of the dimensions is the point count and the other dimension is the pose count. The significance of the view flags status is as follows: when the view flag is set to "front," the tablet is effectively recording Y and Z coordinates or points. When the view flag is set to "side," the tablet will effectively encode X and Z coordinates. However, only the value of the X coordinate need be saved from the side view since the Z coordinate had been entered when the flag was at front.

After block 104, the three-dimensional mechanism such as the mannequin shown in the preceding figures is mounted and set in the frontal position, i.e., to correspond to the view flag being set to front. Thereafter, the execution of the program waits until one of the light keys is pointed to or an alphanumeric key is depressed by the user to enable the program to be guided along alternative paths.

Thus, steps 106, 108, 110 and 112 are test steps to ascertain which of the light keys have been pointed to. For example, in test step 106, a test is made as to whether an alphanumeric key on the interactive graphics device is depressed. This test signifies that the executor of the program is holding the tablet stylus in contact with a point on the three-dimensional mechanism which it is desired to be encoded by the tablet. In such a situation, if step 106 results in a "yes," then the program will move to step 114 wherein the X and Y tablet coordinate values are entered into the program. The program then moves to step 116 wherein the point count is incremented by one which signifies that a point now has been entered into the program. Step 118, wherein the point count is displayed, is merely a mechanism made available to the program executor to enable him to insure that the step executed in step 116 has been accomplished. Also, the displaying of the point count is an assistance to the program executor to enable him to check which points he has encoded.

The program then moves to step 120 wherein a test is made as to whether the view flag is at front. In this situation initially, of course it is and this signifies that at this time Z and Y coordinates information is being encoded. The program thereby moves to step 122. In step 122, the internally stored variable Y which is indexed by the point count and the pose count is set to the tablet value of the coordinate X. Step 124 is a step similar to that of 122 but the internally stored variable is the value of the Z coordinate set to the value of the tablet Y coordinate and indexed by point and pose counts. Steps 122 and 124 together effect the storage of the projection of a particular point on the three-dimensional mechanism onto the tablet surface. A test is now made in step 125 as to whether the point count is less than the maximum on the mannequin. The maximum point count on the mannequin is that count which is the total number of points thereon. Obviously, if this test shows that the point count is less than the maximum, there remain points to be encoded on that particular view, i.e., the situation where the view flag is set to front. It is, of course, to be realized that this maximum can be varied depending upon the point occurrence on the three-dimensional mechanism.

Thus, if step 125 results in a "no," the program moves to step 126 where the point count is set to zero. The setting of the point count to zero at this juncture conditions the program to receive points from the side view. Accordingly, in step 128, the view flag is set to side whereupon the program now loops back to step 106. It can be assumed that, if in step 120 the test would have shown that the view flag was set to side and not to front, thereby the program would have moved to step 130.

Step 130 is similar to steps 122 and 124 except that the three-dimensional variable X which is stored and indexed by point and pose is set to the X tablet value (the view flag is at side). From step 130, the program moves to test step 132 wherein a test is made similar to that of step 124 i.e., as to whether the point count on the mannequin is less than the maximum. If it is not, then the program moves to step 134 wherein there is displayed on the interactive graphics device screen the current pose of the mannequin in isometric projection.

Step 136 is a step similar to 118 and is merely an aid to the program executor for him to check whether the points are being encoded as desired. The program then loops to step 138 which is similar to step 126, i.e., it now conditions the program to receive point count information from the front view. Accordingly, in step 140, the view flag is now set to front. In step 142, the pose count is incremented by one. This incrementing signifies that a complete pose has been entered. In other words, there has now been completed at this juncture the entering of all of the points in one position of the three-dimensional mechanism. In step 144, the test is now made as to whether the pose count exceeds the maximum. If only one pose is desired, at this point in the program, the pose count could exceed the maximum. However, since generally speaking, more than one pose encoding will be desired, the program loops back to step 106. At this time, if the pose count is not completed for all poses, the program will then loop through the stages as described hereinabove and will continue until as many poses as desired have been encoded in the program. Alternatively, if step 144 results in "yes," this means that the encoding is completed for the poses and in step 146 there are calculated the direction cosines of limbs on the mannequin for the pose position. This calculation utilizes, as illustrated in FIG. 9, the direction cosines which now will furnish the information as to the orientation of the points on the three-dimensional mechanism relative to one another. The program then moves to step 148.

In step 148, there are calculated and stored the positions in space of fixed points for intermediate time periods. To understand the significance of this step, it is to be realized that there are being encoded both of the view poses. However, for practical reasons, it is generally desired to calculate the position of the mannequin for a great multiplicity of intermediate time periods.

From step 148, the program moves to step 150 whereby, by linear interpolation of direction cosines, there are located and stored the positions in space of movable points for intermediate time periods. By the term linear interpolation there is meant equal changes of direction cosines calculated for the isometric projections of the intermediate poses, and such calculations are stored. This can be understood to pertain to those intermediate positions which have not been actually encoded but which have been calculated in steps 148 and 150. By step 157, there are now displayed on the screen of the interactive graphics device all of the poses that have been encoded as they successively occur to, in a sense, give the total animated sequence. The program then loops back to step 106. Thus, there has been described how the changes in motion of a three-dimensional mechanism can be completely encoded to provide a sequential animated display.

Referring back to step 106, assuming that it had resulted in a "no," then in step 108 the test would be made as to whether the "do over" light has been pointed to. The do over light enables the re-execution of the program in part or in whole if an error has been detected. In the event that step 108 results in a "yes," then the program moves to step 156 wherein the pose count is decreased by one. Such decrementing in effect removes the preceeding encoded point which has been erroneously encoded. In step 158, the pose count is set to one if it is found to be at zero. The significance of this step is that the pose count as shown in assignment block 104 initially begins with a value of one. If the pose count were to be at zero, then the program would be unable to store points information. Step 160 wherein the pose count is displayed is similar to step 126 and step 136 and is an aid to the programmer to enable him to make the check.

In the event that step 108 were to result in a "no," then the program would go to step 110 wherein the test would be made as to whether the restart light key is detected to enable the programmer to commence the execution of the program from its inception. He may wish to do this in situations where he may desire to change the sequence of poses which he wishes to encode or if he loses his place, or for other reasons. Also, it may be employed where he wishes to encode a new sequence. In the event that step 110 results in a "yes," the program moves back to step 100. In the event that step 110 results in a "no," then in step 112, a test is made as to whether the "action" light key is detected. The action light key enables the programmer to review the information that he has recorded in the sequential poses so far gone through. In this situation, he need not loop through the program at all, but can go directly to step 146 wherein he can now calculate the various values in steps 146 to 152 and produce his display by step 154. In the event that step 112 results in a "no," then the program moves back to step 106.

Thus, with the program as depicted in FIG. 10 and described hereinabove, there has been shown how the mechanism and the points thereon can be encoded to enable the production of a whole series of sequential movements of a three-dimensional mechanism as desired.

It is to be understood that the positions of the mannequin encoded by the method described herein can be telecommunicated to another computer which can now use this data to calculate the position and appearance of a more detailed three-dimensional entity for high quality computer generated animation. These positions encoded by the method described herein can also be stored in computer addressable storage, such as, disk or magnetic tape or can be recorded on cards for later reference or use by other computers and programs.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method for encoding an inanimate object comprising the steps of:

providing a plurality of sensable coordinates pickup points on said object;

sensing said pickup points in coordinates orientation to provide said coordinates information for each of said points;

providing said sensed coordinates information to a digital computer for storing said information in said computer; and calculating in said computer, utilizing only said points coordinates information, a displayable projection of said object.

2. A method for encoding different positions of movable mechanisms comprising the steps of:

providing on said mechanism a plurality of sensable coordinates pickup points;

disposing said mechanism in different planar orientations relative to the plane of the surface of a device which in response to the projections thereonto of sensed points produces Cartesian coordinates information relative to said sensed points;

sensing said pickup points for said different planar orientations of said mechanism;

storing in a computer said Cartesian coordinates information produced by said device for each of said orientations; and calculating in said computer utilizing said coordinates information, displayable projections of said mechanism in each of said orientations.

3. A method as defined in claim 2 wherein there is further calculated by interpolation, positions of said mechanism intermediate said planar orientations to produce an animated sequence of the movements of said mechanism.

4. A method for encoding movable mechanisms to produce a series of displayable projections which can be displayed sequentially to provide an animated sequence comprising the steps of:

providing on said mechanism a plurality of sensable coordinates pickup points, projecting said mechanism relative to the surface of tablet means which is associated with a computer controlled interactive graphics device in different orientations;

sensing said pickup points for said different orientations of said mechanism to cause the projection of said sensed points on the surface of said tablet means;

generating in said tablet means Cartesian coordinates information for said sensed points;

providing said Cartesian coordinates information to said computer for storing said information in said computer;

and calculating in said computer utilizing said coordinates information displayable projections of said mechanism in each of said orientations.

5. A method as defined in claim 4 wherein the capacitance tablet means has a stylus associated therewith, said stylus being utilized to sense said points on said mechanism.

6. A method as defined in claim 4 wherein selectively actuable wires are utilized to sense said points on said movable mechanism.

7. A method as defined in claim 6 wherein said selectively actuable wires are actuated by a selector switch.

8. A method as defined in claim 4 wherein there is utilized a model of the mechanism to be encoded which contains movable sections that can be placed in different positions for the encoding of Cartesian coordinates formation.

9. A method as defined in claim 4 wherein the calculating comprises the steps of:

calculating the direction cosines of different sections of said mannequin for said orientations;

calculating and storing the positions of fixed points for intermediate time periods;

locating and storing by linear interpolation of said direction cosines the positions in space of movable points for intermediate time periods;

calculating and storing projections of said orientations and said intermediate time period positions.

10. A method as defined in claim 9 wherein the projections which are calculated are isometric whereby there can be displayed on said interactive graphics device, all of said projections in an animated sequence.

* * * * *